(12) United States Patent
Takasu et al.

(10) Patent No.: US 9,588,721 B2
(45) Date of Patent: Mar. 7, 2017

(54) PRINT CONTROL DEVICE, PRINTING SYSTEM, AND CONTROL METHOD OF A PRINT CONTROL DEVICE

(71) Applicant: Seiko Epson Corporation, Tokyo (JP)

(72) Inventors: Kazuhiro Takasu, Shiojiri (JP); Hideo Nakamura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/874,905

(22) Filed: Oct. 5, 2015

(65) Prior Publication Data

US 2016/0110137 A1 Apr. 21, 2016

(30) Foreign Application Priority Data

Oct. 16, 2014 (JP) ................. 2014-212047
Oct. 16, 2014 (JP) ................. 2014-212048
Oct. 16, 2014 (JP) ................. 2014-212049

(51) Int. Cl.
*G06F 3/12* (2006.01)
*G06K 15/02* (2006.01)
*B41J 11/70* (2006.01)

(52) U.S. Cl.
CPC ............ *G06F 3/121* (2013.01); *G06F 3/1207* (2013.01); *G06F 3/1261* (2013.01); *G06F 3/1285* (2013.01); *G06F 3/1208* (2013.01)

(58) Field of Classification Search
None
See application file for complete search history.

(56) References Cited

U.S. PATENT DOCUMENTS

| | | | | |
|---|---|---|---|---|
| 7,061,635 B1* | 6/2006 | Wanda | ................. | G06F 3/1213 358/1.1 |
| 2004/0080779 A1* | 4/2004 | Kawamoto | ........... | G06F 3/1204 358/1.14 |
| 2005/0271446 A1* | 12/2005 | Minowa | .................. | B26D 5/30 400/621 |
| 2006/0092461 A1* | 5/2006 | Kitada | ................. | G06F 3/1222 358/1.15 |
| 2006/0227363 A1* | 10/2006 | Ogura | .................. | G06F 3/1261 358/1.15 |
| 2008/0165379 A1* | 7/2008 | Zuber | .................... | B41J 29/393 358/1.9 |
| 2008/0170264 A1* | 7/2008 | Nino | .................. | H04N 1/00238 358/1.17 |

(Continued)

FOREIGN PATENT DOCUMENTS

| | | | | |
|---|---|---|---|---|
| JP | 06-035634 A | 2/1994 | | |
| JP | 06-035927 | * 2/1994 | ............ | G06F 15/21 |

(Continued)

*Primary Examiner* — Beniyam Menberu

(57) ABSTRACT

An interface board 3a used as a print control device has a reception unit 310 that receives print data; and a print control unit 320 that applies redirection control to send the print data to a second printing device different from the first printing device when the first printing device, which is the first print destination of the print data, is unable to print. In redirection control, the print control unit 320 sends the print data and additional information to the second printing device. The additional information includes status information causing the second printing device to print the status of the first printing device.

17 Claims, 18 Drawing Sheets

(56) References Cited

U.S. PATENT DOCUMENTS

| | | | | |
|---|---|---|---|---|
| 2009/0091783 A1* | 4/2009 | Kazume | ............ | H04N 1/00222 358/1.15 |
| 2009/0303534 A1* | 12/2009 | Gotoh | ................ | G03G 15/5075 358/1.15 |
| 2010/0085602 A1* | 4/2010 | Okada | ................ | H04N 1/00411 358/1.18 |
| 2011/0217050 A1* | 9/2011 | Harada | .................. | G03G 15/00 399/9 |
| 2013/0163037 A1* | 6/2013 | Huster | .................. | G06F 3/1205 358/1.15 |
| 2014/0022581 A1* | 1/2014 | Furuhata | ............... | G06F 3/1206 358/1.13 |
| 2015/0092219 A1* | 4/2015 | Kanemoto | .............. | G06F 3/121 358/1.14 |

FOREIGN PATENT DOCUMENTS

| | | |
|---|---|---|
| JP | 06-035927 A | 2/1994 |
| JP | 2009-206739 A | 9/2009 |
| JP | 2011-240506 A | 12/2011 |
| JP | 2012-134587 A | 7/2012 |

* cited by examiner

■ PRINT DATA FOR ORDER TICKET
■ PRINT DATA FOR ORDER PREPARATION TICKET
  ☐ PRINT DATA FOR GRILL TICKET + DESTINATION CODE FOR PRINTER 1  ⎤
  ☐ PRINT DATA FOR FRYER TICKET + DESTINATION CODE FOR PRINTER 2  ⎬ INCLUDES ONE OR MORE
  ☐ PRINT DATA FOR STOVE TICKET + DESTINATION CODE FOR PRINTER 3  ⎦

FIG. 5

[PRINTING DEVICE TABLE]

| PRINTING DEVICE | ADDRESS | DESTINATION CODE |
|---|---|---|
| PRINTER 1 | 0 0 0 1 | P R a |
| | | P R b |
| PRINTER 2 | 0 0 0 2 | P R c |
| | | P R d |
| PRINTER 3 | 0 0 0 3 | P R e |

FIG. 11

[REDIRECTION PATH TABLE]

| DESTINATION CODE | REDIRECTION PATH |
|---|---|
| PRa | 0001 → 0002 → 0003 |
| PRb | 0001 → 0003 → 0002 |
| PRc | 0002 → 0001 → 0003 |
| PRd | 0002 → 0003 → 0001 |
| PRe | 0003 → 0001 → 0002 |

FIG. 12

| | REDIRECTION CONTROL SETTINGS | | ~D1 |
|---|---|---|---|
| ADDITIONAL PRINT DATA | REDIRECTION MESSAGE | *** REDIRECTED *** ▼ | |
| | PRINTING DIRECTION | ⊙NORMAL ○REVERSE | |
| | PRINTING POSITION | ⊙BEFORE ○AFTER | |
| | CUT PAPER | ⊙YES ○NO | |
| | DECORATION | ☑BOLD ☐UNDERLINE ☐DOUBLE WIDTH ☐DOUBLE HEIGHT ☐ROTATE | |
| | APPLY ~51 | | |

FIG. 14

PRINT CONTROL DEVICE, PRINTING SYSTEM, AND CONTROL METHOD OF A PRINT CONTROL DEVICE

Priority is claimed under 35 U.S.C. §119 to Japanese Application nos. 2014-212047, 2014-212048, and 2014-212049, each filed Oct. 16, 2014, and each hereby incorporated by reference in its entirety.

BACKGROUND

1. Technical Field

The present disclosure relates to a print control device, a printing system, and a control method of a print control device capable of routing print commands when an error occurs on a printer to a different printer.

2. Related Art

Related technology is described in JP-A-H6-35927. More specifically, JP-A-H6-35927 describes an order data management device that sends output data based on a customer order to a connected kitchen printer, and controls redirecting the order data to a different kitchen printer when an error occurs on the kitchen printer to which the order data was sent. JP-A-H6-35927 also describes the order data management device adding the name of the kitchen printer where the error occurred to the output data when redirecting the print data. By adding the name of the kitchen printer in an error state, kitchen staff reading the order ticket (printout) can know the work station from which the data was rerouted and take appropriate action, such as taking the order ticket to that station.

However, even if kitchen staff can determine the work station from which data was redirected, the technology in JP-A-H6-35927 does not enable determining why the data was redirected. More specifically, determining whether the cause of the error is a connection problem or a no-paper error, for example, is difficult. Resolving the error is therefore time-consuming, and reduces productivity.

Furthermore, when a kitchen printer is installed at each work station, such as the deep fryer, grill, and stove, related technologies such as described in JP-A-H6-35927 redirect print data along fixed routes, such as rerouting print data to the grill printer when an error occurs with the printer at the frying station.

Depending on the menu, however, print data intended for the kitchen printer at the fryer station, for example, may be better redirected to the kitchen printer at the grill, or better redirected to the kitchen printer at the stove. For example, if a set menu including items prepared at the fryer and at the stove is ordered, and an error occurs with the kitchen printer for the fryer, redirecting print data for the fryer to the kitchen printer for the stove instead of to the kitchen printer for the grill, which is not involved with preparing the set menu items, may improve overall productivity by allowing the kitchen staff to adjust the finish time for the dishes amongst themselves.

Furthermore, redirecting print data only to a specific kitchen printer increases the processing load on that printer, and increases the work load on the kitchen staff at that station because they must deliver the redirected order tickets to the other work stations.

Some kitchen printers discharge order tickets from the front, and some discharge printouts from the top. Other kitchen printers enable discharging printouts from the top or from the front by changing the orientation of the printer. For example, if as shown in FIG. 15 (*a*) order tickets are discharged from the bottom end of the ticket from a front discharge printer that discharges the order tickets from the front, the tickets are discharged in the normal upright orientation and can be easily read by the kitchen staff from the front of the printer (arrow A1). Likewise, if as shown in FIG. 15 (*b*) order tickets are discharged from the top end of the ticket from a top discharge printer that discharges the order tickets from the top, the tickets are discharged in the normal upright orientation and can be easily read by the kitchen staff from the top front of the printer (arrow A2).

The direction of printing by some kitchen printers that are currently in use can therefore be changed by the application that generates the print data for order tickets. However, when redirection is controlled as described in JP-A-H6-35927, and additional print data, such as the name of the kitchen printer where there is an error, is added to the print data for the order ticket (referred to below as as the "main print data"), the main print data and the additional print data may not be printed in the same direction. Depending on the location of the kitchen staff to the printer or the application of the printer, the main print data and the additional print data may also be desirably printed in opposite directions. Technology for changing the printing format, such as the printing direction, of the additional print data has yet to be proposed, however.

SUMMARY

The present disclosure is therefore directed to a print control device, a printing system, and a control method of a print control device that enable the user reading a printout to know the reason why the printout was redirected.

The disclosure is also directed to a print control device, a printing system, and a control method of a print control device that can reduce the drop in worker productivity and the control load of the printer when redirection control is required.

The disclosure is also directed to a print control device, a printing system, and a control method of a print control device that enable changing according to the user's need the printing format of additional print data that is added during redirection control.

A print control device according to the disclosure has a reception unit that receives print data; and a print control unit that applies redirection control to send the print data to a second printing device different from the first printing device when the first printing device, which is the first print destination of the print data, is unable to print. In redirection control, the print control unit sends the print data and additional information to the second printing device during redirection control. The additional information includes status information causing the second printing device to print the status of the first printing device.

A printing system according to the disclosure includes: a print data supply device; a print control device; and multiple printing devices. The print control device has a reception unit that receives print data from the print data supply device, and a print control unit that applies redirection control to send the print data to a second printing device different from the first printing device in the group of multiple printers when a first printing device that is the first print destination of the print data in the group of multiple printers is unable to print. In redirection control, the print control unit sends the print data and additional information to the second printing device during redirection control. The additional information includes status information causing the second printing device to print the status of the first printing device.

A control method of a print control device according to the disclosure includes: a reception step of receiving print data; and a print control step of applying redirection control to send the print data to a second printing device different from the first printing device when a first printing device that is the first print destination of the print data is unable to print, and sending the print data and additional information to the second printing device during redirection control. The additional information includes status information causing the second printing device to print the status of the first printing device.

When data is redirected in this aspect of the disclosure, additional information representing the status of the first printing device from which data is redirected is sent to the second printing device, the destination device to which the data is redirected. The user can therefore know why print data was redirected by reading the printout from the second printing device. As a result, the first printing device can be quickly restored to the normal operating condition.

Note that "unable to print" as used herein conceptually includes error states and busy states.

In a print control device according to another aspect of the disclosure, the additional information includes identification information causing the second printing device to print an identifier of the first printing device.

Thus comprised, the user can know the source printing device from which data was redirected by reading the printout from the second printing device. As a result, when there are three or more printing devices used in redirection control, which printer must be reset to the normal operating condition can be easily determined.

In a print control device according to another aspect of the disclosure, the print control unit generates a print job for redirection control by adding additional print data expressing the additional information by text or image to main print data, which is the print data the reception unit receives, and sends the print job to the second printing device.

Because the print control device in this aspect of the disclosure creates a new print job, the control load of the printing device can be reduced. For example, when the print control device does not generate a print job, the main print data and an additional information code representing the additional information may be sent to the destination printing device, and the destination printing device could generate the additional print data corresponding to the additional information code. The disclosure eliminates the need for the destination printing device to process this information, and a printing device with a low power processor can be used as the second printing device.

In a print control device according to another aspect of the disclosure, the print job includes a cut paper command to cut the paper between the main print data and the additional print data.

This aspect of the disclosure enables separately using the print area printed with the main print data and the print area printed with the additional print data.

Note that the paper cut is not limited to a full cut, and may be a partial cut leaving a single uncut portion, a partial cut leaving multiple uncut portions, or a perforation. The cut may also be a half cut that cuts only the printed layer when the print medium is label paper having a printing layer and a separable liner, for example.

In a print control device according to another aspect of the disclosure, the print control unit adds decoration differentiating the additional print data from the main print data to the additional print data.

Thus comprised, user reading the printout can recognize the main print data and the additional print data at a glance.

Note that decoration as used herein includes changing the font face, font size, or text color of text strings, and adding text styles. A border may also be added around the print area where the additional print data is printed, a watermark printed in the print area, or a special mark printed in part of the print area.

In a print control device according to another aspect of the disclosure, the print control unit generates the print job so that the printed length of the additional print data and the main print data is the same as the printed length when printing only the main print data.

Thus comprised, additional paper is not consumed to add the additional print data (when redirection control is required), thereby helping conserve resources.

Note that the redirected print job may be generated in this case by superimposing the additional print data on the main print data, or reducing and adding the additional print data to white space in the main print data.

In a print control device according to another aspect of the disclosure, when the second printing device is unable to print, the print control unit sends the print data the reception unit received, the additional information of the first printing device, and the additional information of the second printing device to a third printing device that is different from the first printing device and the second printing device.

When data is redirected twice in this aspect of the disclosure, the status and identifier of each of the two devices to which the data was sent first are printed by the third printing device, and the user can therefore know that two printing devices are unable to print. This method enables the user to know that multiple devices cannot print, and as a result can quickly take corrective action.

Note that when data is redirected three or more times, status information about each of the printers from which data is redirected is preferably sent to the next destination printer.

In a print control device according to another aspect of the disclosure, the reception unit receives print data for order content; and the print control unit determines the redirection path for redirection control according to the order content in the print data.

In a printing system according to another aspect of the disclosure, the reception unit of the print control device receives print data indicating order content from the print data supply device; and the print control unit of the print control device determines the redirection path for redirection control according to the order content in the print data.

In a control method of a print control device according to another aspect of the disclosure, the reception step receives print data for order content; and the print control step determines the redirection path for redirection control according to the order content in the print data.

Thus comprised, because the redirection path is determined according to the order content of the print data during redirection control, print data can be redirected to the appropriate printer in a group of plural printers used for redirection based on the order content, and the drop in user productivity (efficiency) due to redirection control can be reduced. Furthermore, because data can be redirected to different printers, increasing the control load on a specific printing device as a result of redirection control can be prevented.

Note that the redirection path means the order of the identification information of the destination printing devices, such as the first destination, the first redirection destination, and so forth to the N th (where N is an integer of 2 or more) redirection destination.

A print control device according to another aspect of the disclosure preferably also has a print settings unit that configures print settings including the printing direction of the additional information; and in the print control device, the print control unit sends the additional information based on a setting of the print settings unit added to the print data during redirection control.

In a printing system according to another aspect of the disclosure, the print control device preferably also has a print settings unit that configures print settings including the printing direction of the additional information; and the print control unit of the print control device sends the additional information based on a setting of the print settings unit added to the print data during redirection control.

A control method of a print control device according to another aspect of the disclosure preferably also has a print settings step of configuring print settings including the printing direction of the additional information; and the print control step sends the additional information based on a setting of the print settings step added to the print data during redirection control.

This aspect of the disclosure enables the user to configure print settings, including the printing direction of the additional information, and when a print job is redirected, additional information based on the print settings is added and sent with the print data. As a result, the printing format of the additional information can be changed according to the user's need. For example, the printing direction of the additional information may be matched to the printing direction of the main print data, or the direction may be intentionally reversed.

Note that the additional information may be a text string or an image indicating redirection.

A print control device according to another aspect of the disclosure preferably also has a print settings storage unit that stores print settings of a first printing device and second printing device used in redirection control; and the print control unit references the print settings storage unit in redirection control, and sends additional information based on a print setting of the second printing device added to the print data.

This aspect of the disclosure stores a print settings table containing print settings for the first printing device and second printing device, and additional information based on the print settings appropriate to the first printing device and second printing device are added to and sent with the print data during redirection. Thus comprised, the printing format of the additional information can be set appropriately to the printing device (according to the model or the orientation of the printing device, for example).

Note that the print settings may include such settings as the printing direction of the additional information, the printing position of the additional information relative to the main print data, a redirection message that is printed as at least part of the additional information, decoration added to the additional information, and whether or not to cut the paper between the main print data and the additional information.

In a printing system according to another aspect of the disclosure, the print control unit of the print control device sends a status code indicating the status of the first printing device, and an identification code of the first printing device, as additional information to the second printing device during redirection control; and the second printing device has an additional print data generator that generates additional print data including a status message converting the status code to text or an image, and an identifier converting the identification code to text or an image, and a print unit that adds and prints the additional print data with main print data, which is the print data sent from the print control device.

Thus comprised, the print control device of the printing system sends only the status code and identification code as the additional information to the printing device, and can reduce the amount of transmitted data when compared with sending the additional print data to the printing device. The printing format (decoration and printing position) of the status message and identifier can also be customized.

A print control device according to another aspect of the disclosure has a reception unit that receives print data expressing order content; and a print control unit that applies redirection control to send the print data to another printing device that is different from any particular printing device when the particular printing device, which is the first destination of the print data, is unable to print. The print control unit determines the redirection path for redirection according to the order content of the print data.

Another printing system according to the disclosure includes: a print data supply device; a print control device; and multiple printing devices. The print control device has a reception unit that receives print data expressing order content, and a print control unit that applies redirection control to send the print data to another printing device different from the particular printing device in the group of multiple printers when the particular printing device that is the first destination of the print data in the group of multiple printers is unable to print. The print control unit determines the redirection path for redirection control according to the order content of the print data.

Another aspect of the disclosure is a control method of a print control device, the control method including a reception step of receiving print data expressing order content; and a print control step applying redirection control to send the print data to another printing device different from a particular printing device in a group of multiple printers when the particular printing device that is the first destination of the print data is unable to print. The print control step determines the redirection path for redirection control according to the order content of the print data.

Thus comprised, because the redirection path is determined according to the order content of the print data during redirection control, print data can be redirected to the appropriate printer in a group of plural printers used for redirection based on the order content, and the drop in user productivity (efficiency) due to redirection control can be reduced.

In a print control device according to another aspect of the disclosure, a destination printer code corresponding to the order content is added to the print data, and the print control unit determines the redirection path for redirection control based on the destination printer code.

This aspect of the disclosure can be applied to a system in which the print data supply device that supplies print data adds a different destination printer code based on the order content. For example, when an order terminal in a restaurant adds and sends information specifying a particular kitchen printer to the order content print data, the print control device can determine the redirection path using the information specifying the kitchen printer.

In a print control device according to another aspect of the disclosure, the redirection path is defined by the order of the addresses uniquely assigned to each printing device. The print control device also has a table storage unit that stores a printing device table relationally storing each address to one or more destination printer codes, and a redirection path table relationally storing each destination printer code to a redirection path. The print control unit references the table storage unit to determine the redirection path for redirection control.

Thus comprised, when the print data supply device adds a different destination printer code based on the order content, and there is not a 1:1 relationship between addresses and destination printer codes, the redirection paths are constant. However, because addresses and destination printer codes can be stored in a 1-to-many relationship, the destination for redirection can be changed based on the order content without changing the configuration (application) of the print data supply device.

A print control device according to another aspect of the disclosure preferably also has a print data storage unit that nonvolatilely stores received print data. When unprinted print data is stored in the print data storage unit when the power turns on, and the particular printing device to which the print data is addressed is unable to print, the print control unit redirects the print data.

Thus comprised, the printing process can be reliably resumed if the power turns off before the printing process ends. As a result, problems such as orders being lost in a restaurant because an order preparation ticket is not printed can be prevented.

In a print control device according to another aspect of the disclosure, the print control unit sends the print data, and additional information causing the destination printer to print the identifier and status of the source printing device from which the print data is redirected, to the printing device to which the print data is redirected by redirection control.

Thus comprised, because additional information causing the destination printing device to print the status and identifier of the printing device from which data is redirected is sent to the destination printing device in redirection control, the user can know from the printout from the destination printing device why data was redirected and the printing device from which the data was redirected. The source printing device can therefore be easily determined, and corrective action quickly taken.

A print control device according to another aspect of the disclosure includes a reception unit that receives print data; a print control unit that handles redirection control sending the main print data, which is the print data received by the reception unit, and additional print data indicating redirection, to another printing device that is different from a particular printing device, which is the device to which the print data was sent, when the particular printing device is unable to print; and a print settings unit for setting the printing direction of the additional print data. In redirection control, the print control unit adds and sends the additional print data based on a setting in the print settings unit with the main print data.

Another aspect of the disclosure is a printing system including a print data supply device, a print control device, and multiple printing devices.

The print control device has a reception unit that receives print data; a print control unit that handles redirection control sending the main print data, which is the print data received by the reception unit, and additional print data indicating redirection to another printing device that is different from a particular printing device, which is the device to which the print data was sent, in the group of multiple printing devices when the particular printing device is unable to print; and a print settings unit for setting the printing direction of the additional print data. In redirection control, the print control unit adds and sends the additional print data based on a setting in the print settings unit with the main print data.

A control method of a print control device according to another aspect of the disclosure includes: a reception step that receives print data; a print control step that handles redirection control sending the main print data, which is the print data received in the reception step, and additional print data indicating redirection, to another printing device that is different from a particular printing device, which is the device to which the print data was sent, when the particular printing device is unable to print; and a print settings step for setting the printing direction of the additional print data. In redirection control, the print control step adds and sends the additional print data based on a setting of the print settings step with the main print data.

This aspect of the disclosure enables setting the printing direction of additional print data indicating redirection, and when data is redirected, adds additional print data based on the print settings to the main print data. The printing format of the additional information can also be changed according to the user's need. For example, the printing direction of the additional information may be matched to the printing direction of the main print data, or the direction may be intentionally reversed.

Note that the additional information may be a text string or an image indicating redirection.

In a print control device according to another aspect of the disclosure, the print settings unit also enables setting the printing position of the additional information relative to the main print data.

Thus comprised, the printing position of the additional print data to the main print data can be changed according to the user need.

In a print control device according to another aspect of the disclosure, the print settings unit also enables setting a redirection message that is printed as at least part of the additional information.

Thus comprised, redirection message that is printed as at least part of the additional information can be changed according to the user need.

The print settings unit may enable inputting a text string as the redirection message, or selecting the redirection message from among plural candidate messages.

In a print control device according to another aspect of the disclosure, the print settings unit also enables setting decoration added to the additional information.

Thus comprised, decoration applied to the additional print data can be changed according to the user need.

Note that decoration as used herein includes changing the font face, font size, or text color of text strings, and adding text styles. A border may also be added around the print area where the additional print data is printed, a watermark printed in the print area, or a special mark printed in part of the print area.

In a print control device according to another aspect of the disclosure, the print settings unit also enables setting whether or not to cut the paper between the main print data and the additional print data.

This aspect of the disclosure enables whether or not to cut the paper between the main print data and the additional print data according to the user's need.

Note that the paper cut is not limited to a full cut, and may be a partial cut leaving a single uncut portion, a partial cut leaving multiple uncut portions, or a perforation. The cut may also be a half cut that cuts only the printed layer when the print medium is label paper having a printing layer and a separable liner, for example. The type of cut can also be selected through the print settings unit.

In a print control device according to another aspect of the disclosure, the print settings unit also enables configuring the print settings for all printing devices that may be the source or destination for redirection in redirection control in a single batch operation.

Because print settings can set for all printers used in redirection control in a single batch, the print settings can be set more efficiently as the number of printers increases. The risk of setting errors can also be reduced when compared with individually inputting the settings for each printer.

In a print control device according to another aspect of the disclosure, the print settings unit can separately set the printing direction of the additional print data and the printing direction of the main print data.

Thus comprised, there is no need to change the configuration (application) of the print data supply device that supplies the print data, and the printing direction of the additional print data and the printing direction of the main print data may be set separately as desired by the user.

In a print control device according to another aspect of the disclosure, the print settings unit groups all printers that may be the source or destination device for redirection control according to the device model, and configures the print settings by model.

Because the appropriate print settings may differ according to the model, such as the printing direction appropriate for a front-discharge printer and the printing direction for a top-discharge printer, this aspect of the disclosure is particularly effective when different models of printers are used in redirection control.

A print control device according to another aspect of the disclosure includes a reception unit that receives print data; a print control unit that handles redirection control sending the main print data, which is the print data received by the reception unit, and additional print data indicating redirection, to another printing device that is different from a particular printing device, which is the device to which the print data was sent, when the particular printing device is unable to print; and a print settings storage unit for storing print settings for each printing device that may be the source or destination printing device in redirection control. In redirection control, the print control unit references the print settings storage unit to add and send the additional print data based on the print settings for the destination printing device with the main print data.

This aspect of the disclosure stores a print settings table containing print settings for each printing device, and adds and sends additional information based on the print settings appropriate to the destination printer with the main print data. Thus comprised, the printing format of the additional information can be set appropriately to the printing device (according to the model or the orientation of the printing device, for example).

Note that the print settings may include such settings as the printing direction of the additional print data, the printing position of the additional print data relative to the main print data, a redirection message that is printed as at least part of the additional print data, decoration added to the additional print data, and whether or not to cut the paper between the main print data and the additional print data.

Other objects and attainments together with a fuller understanding of the disclosure will become apparent and appreciated by referring to the following description and claims taken in conjunction with the accompanying drawings.

BRIEF DESCRIPTION OF THE DRAWINGS

FIG. 5 shows an example of print data the interface board receives.

FIG. 11 shows an example of a printer table.

FIG. 12 shows an example of a redirection path table.

FIG. 14 shows an example of a redirection control setup screen.

DESCRIPTION OF EMBODIMENTS

Preferred embodiments of a print control device, printing system, and control method of a print control device according to the present disclosure are described below with reference to the accompanying figures. The print control device according to the disclosure is embodied in the embodiments described below by an interface board, which is part of a smart printer. The printing system of the disclosure is also described using the example of an order entry system in a restaurant.

Embodiment 1

Figure 1:
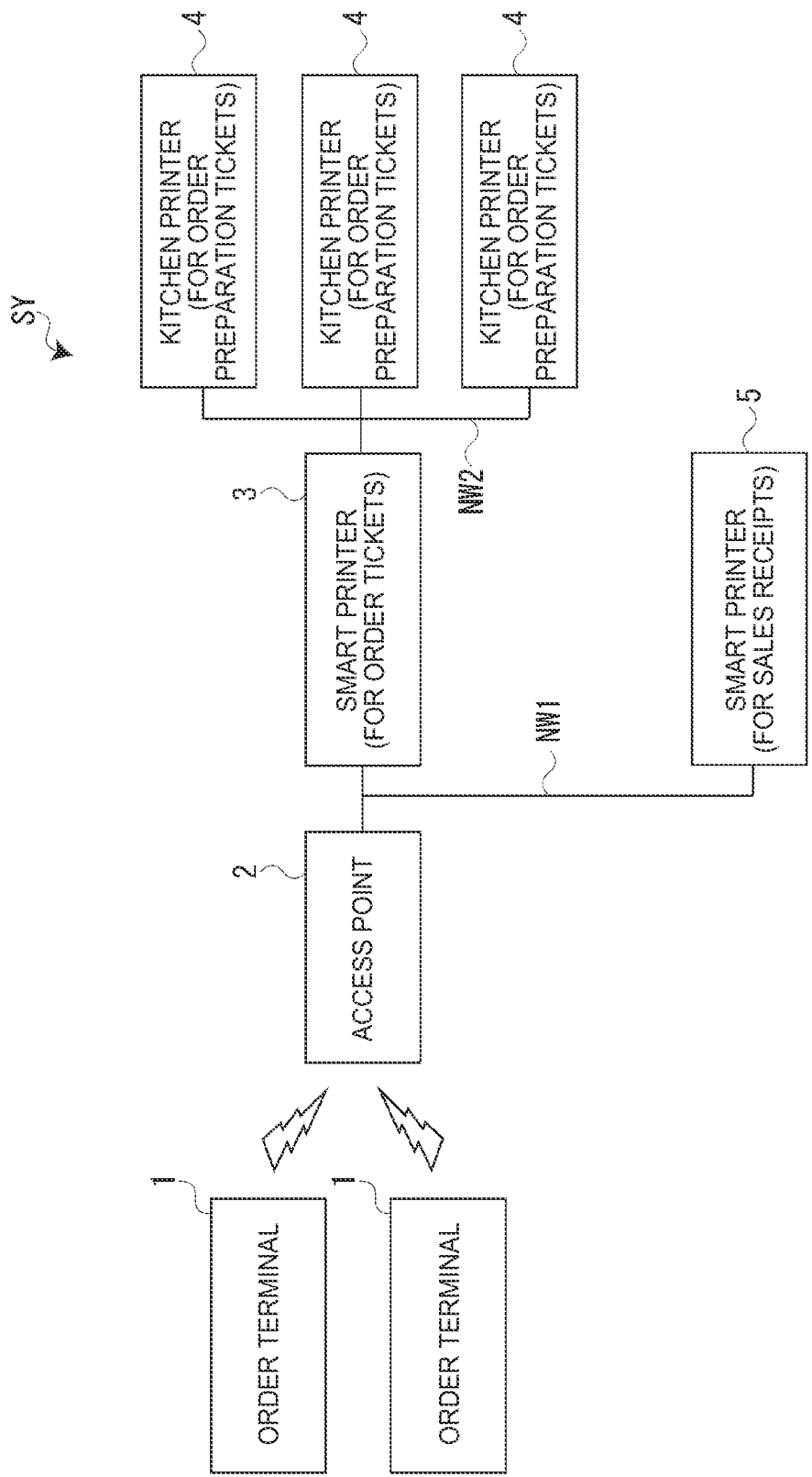
FIG. 1 is a system diagram of an order entry system.

FIG. 1 is a system diagram of an order entry system SY. The order entry system SY includes one or more order terminals 1 (print data supply device, two shown in the figure) used in the dining room of a restaurant, an access point 2 located in the dining room, a smart printer 3 that prints order tickets and is located in the pantry, one or more kitchen printers 4 (printing devices, three shown in the figure) located in the kitchen for producing order preparation tickets, and a smart printer 5 located at the checkout counter for producing sales receipts.

The access point 2 is connected to the order terminals 1 through a wireless LAN, near-field communication, or other network. The access point 2 also connects to the smart printers 3, 5 through a network NW1. The smart printer 3 connects to the kitchen printers 4 through another network NW2. The networks NW1, NW2 may be wireless networks or wired networks. The networks NW1, NW2 may also be built as a single network.

Order content (ordered items and quantities) is input by the waitstaff to the order terminal 1, which generates print data for order tickets (the ticket the customer presents at the checkout counter when paying), and print data for order preparation tickets (tickets instructing the kitchen staff what to prepare).

The smart printer 3 prints order tickets based on the print data for the order tickets transmitted from the order terminal 1. The smart printer 3 also sends the print data for the order preparation tickets sent from the order terminal 1 to the kitchen printers 4 located at the various work stations in the kitchen. In this embodiment, a kitchen printer 4 is installed at the deep fryer station, grill station, and stove station.

When the barcode printed on an order ticket is read with a barcode reader, the smart printer 5 at the checkout counter executes a transaction process based the result of reading the barcode and prints a sales receipt as the result of the transaction process.

When any particular kitchen printer 4 to which print data is sent for printing is unable to print (because an error occurred or the printer is busy), the smart printer 3 also executes a redirection control process that sends the print data intended for printing by that kitchen printer 4 to another kitchen printer 4. Primarily this redirection process of the smart printer 3 is described below.

Figure 2:
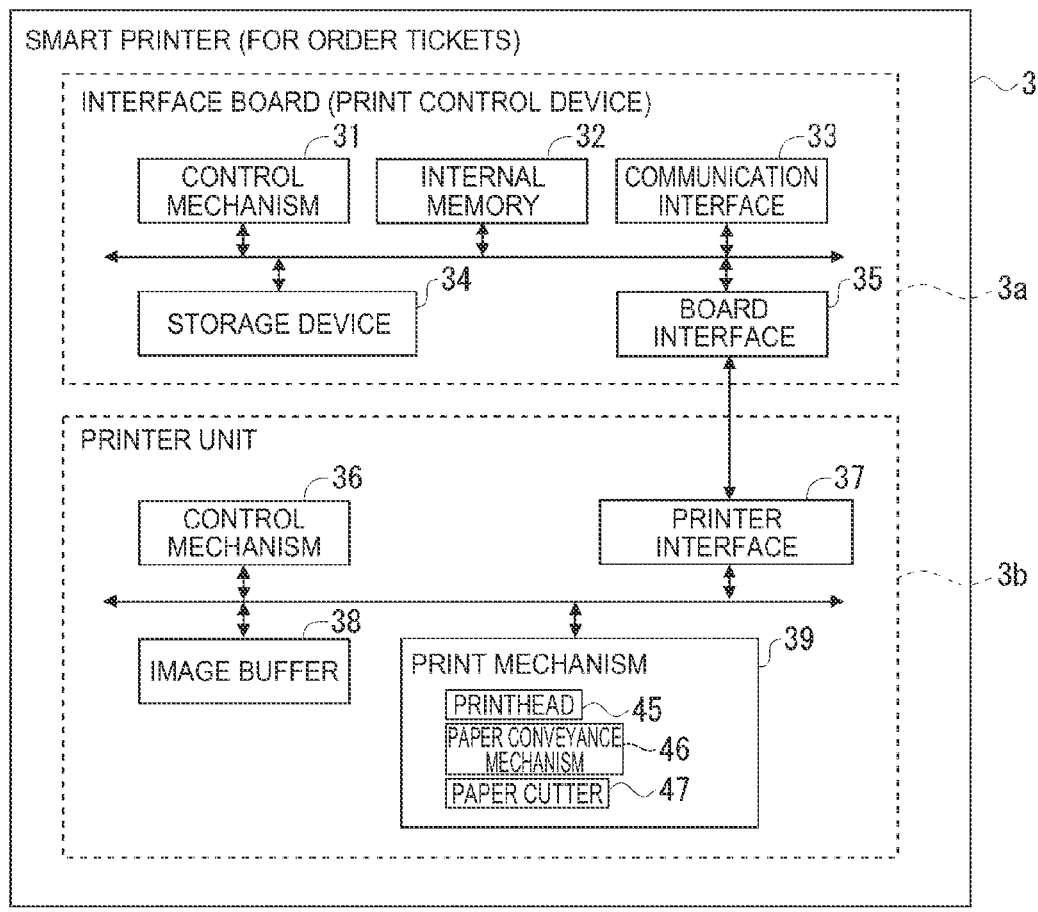
FIG. 2 is a block diagram illustrating the functional configuration of a smart printer.

FIG. 2 is a block diagram illustrating the hardware configuration of the smart printer 3. The smart printer 3 has a printer unit 3*b* and an interface board 3*a* (print control device) that is removably installed to the printer unit 3*b*.

The interface board 3*a* includes a control mechanism 31, internal memory 32, communication interface 33, storage device 34, and board interface 35.

The control mechanism 31 has a CPU (central processing unit) and RAM (random access memory), and controls parts of the interface board 3*a*.

The internal memory 32 nonvolatilely stores control programs and control data. The control programs include in this example a print job generating program that generates the print jobs sent to each kitchen printer 4, and a redirection control program for redirection control. The control data includes printer registry information including the address and model (paper cutting method) of the kitchen printer 4 to which redirection control is applied, as well as the redirection path and retry setting.

A kitchen printer 4 to which redirection control applies means a kitchen printer 4 that may be a source or destination of redirection, and in this embodiment includes the three kitchen printers 4.

Note that the paper cutting methods are described below with reference to FIG. 3. The redirection paths and retry settings are described below with reference to FIG. 7.

The communication interface 33 is connected to network NW1 and network NW2, and communicates with the order terminal 1 and kitchen printers 4.

The storage device 34 stores received print data and the result of printing, and deletes data in FIFO order according to storage capacity of the device.

The board interface 35 communicates with the printer unit 3*b* (printer interface 37).

The printer unit 3*b* includes a control mechanism 36, printer interface 37, image buffer 38, and print mechanism 39.

The control mechanism 36 includes a CPU, RAM, ROM, and other peripheral circuits, and controls the printer unit 3*b*.

The printer interface 37 communicates with the interface board 3*a* (board interface 35).

The image buffer 38 temporarily stores drawing data (the data input to the print mechanism 39) that is generated based on print data for the order tickets.

The print mechanism 39 includes a printhead 45, paper conveyance mechanism 46 (including a platen roller 46*a*), and paper cutter 47, and executes the printing process including printing, conveyance, and cutting the paper (see FIG. 14).

The paper cutter 47 is located downstream from the printhead 45 near the paper exit 42. Each of the printers 3, 4, 5 in this embodiment use roll paper (rolled receipt paper), and produce order tickets, order preparation tickets, and sales receipts by cutting the paper appropriately.

Note that the other smart printer 5 has the same hardware configuration as the smart printer 3 shown in FIG. 2, and executes a transaction process by means of the interface board 3*a* (the interface board 3*a* functions as a POS terminal).

The hardware configuration of the kitchen printers 4 is not specifically shown in the figures, but is substantially the same as the printer unit 3*b* of the smart printer 3. However, the printer interface 37 of the kitchen printer 4 is connected to network NW2, and communicates with smart printer 3 (communication interface 33).

Methods of cutting the paper are described next with reference to FIG. 3. As described above, the address and model of each kitchen printer 4 used for redirection are stored in the internal memory 32 of the interface board 3*a*, and the interface board 3*a* determines based on the model information if the kitchen printer 4 addressed for printing is compatible with a reserve paper cutting position function. The interface board 3*a* sends print data for order preparation instructions and a reserve cut command to models compatible with the reserve paper cutting position function.

Figure 3:
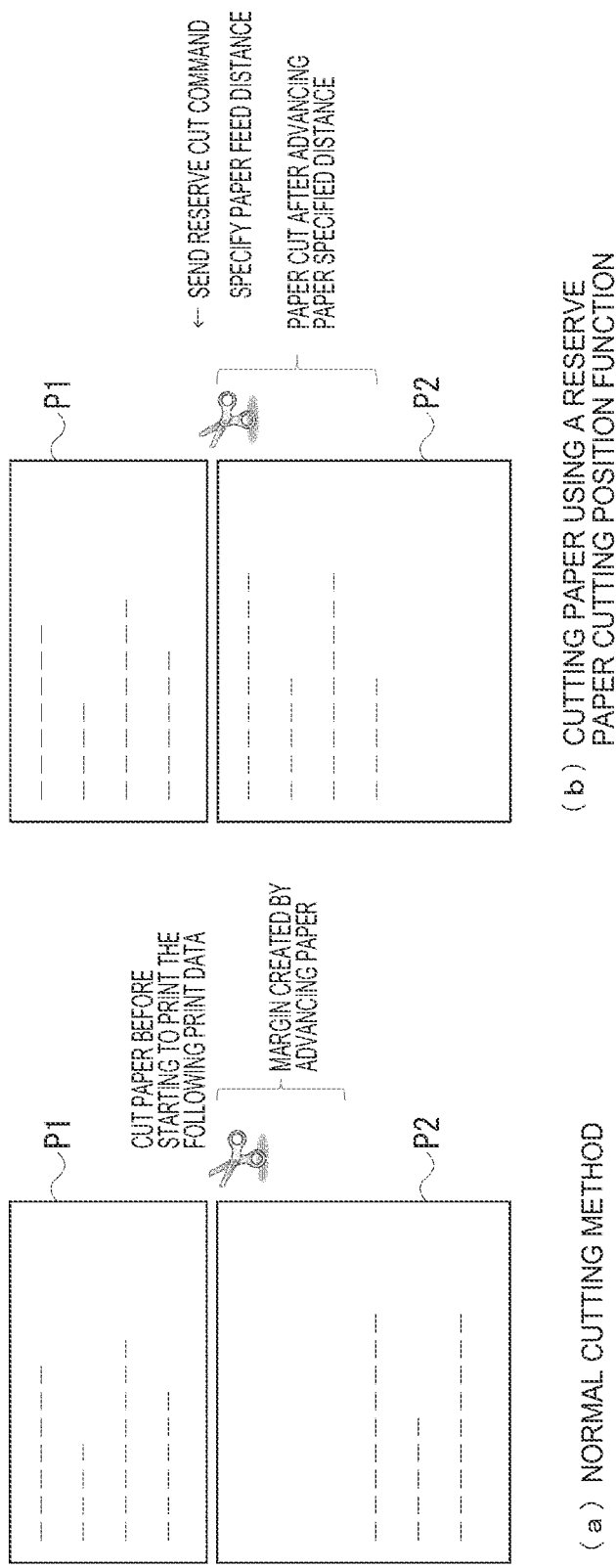
FIG. 3 (a) illustrates a common paper cutting method, and (b) illustrates a method of cutting paper using a reserve paper cutting position function.

FIG. 3 (*a*) illustrates the normal method of cutting the paper when the intended kitchen printer 4 is not compatible with the reserve paper cutting position function. In this event, the kitchen printer 4 cuts the paper after printing the leading print data P1 (printing by the printhead 45) ends, and before printing the following print data P2 starts. As a result, a margin (the length of the conveyance distance from the leading edge of the paper to where printing starts) equal to the paper conveyance distance between the printhead 45 and the paper cutter 47 (referred to below as the head-cutter distance) is created before the following print data P2.

FIG. 3 (*b*) illustrates the paper cutting method when the intended kitchen printer 4 is not compatible with the reserve paper cutting position function. The reserve paper cutting position function eliminates this margin conditionally upon there being following print data P2 (when following print data P2 is printed after the leading print data P1).

As shown in the figure, when the intended kitchen printer 4 is not compatible with the reserve paper cutting position function, the interface board 3*a* sends a reserve cut command and specifies a paper feed distance equal to the head-cutter distance instead of a cut paper command after the leading print data P1. When there is following print data P2, the kitchen printer 4 receiving the reserve cut command cuts the paper after printing the specified paper feed distance after printing starts. As a result, white space before the following print data P2 equal to the head-cutter distance can be eliminated. If there is no following print data P2, the normal paper cutting method shown in FIG. 3 (a) applies.

Figure 4:
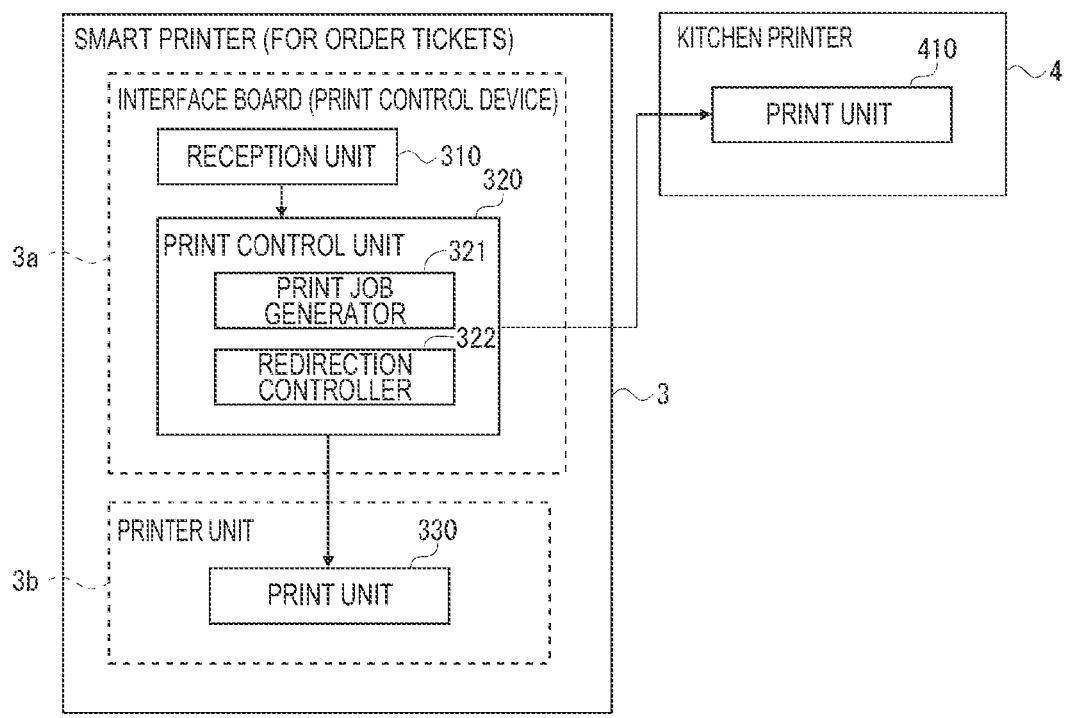
FIG. 4 is a block diagram showing the function of an interface board according to the first embodiment of the disclosure.

The functional configuration of the interface board 3a in the first embodiment of the disclosure is described next with reference to FIG. 4. The functional configuration of the interface board 3a includes a reception unit 310 and a print control unit 320.

The reception unit 310 receives print data from the order terminal 1 through the access point 2. As shown in FIG. 5, the print data the reception unit 310 receives is print data for order tickets and print data for order preparation tickets.

There are three types of print data for order preparation tickets, and the reception unit 310 receives one or more these types of print data together with the order ticket print data.

Added to the print data for order preparation tickets is a destination printer code identifying the kitchen printer 4 that is intended to print the print data (the "intended kitchen printer 4" below).

The combination of order preparation ticket print data and destination printer code in this embodiment is one of: print data for a grill order preparation ticket and the destination printer code of printer 1 (the kitchen printer 4 at the grill station); print data for a fry order preparation ticket and the destination printer code of printer 2 (the kitchen printer 4 at the fryer station); and print data for a stove order preparation ticket and the destination printer code of printer 3 (the kitchen printer 4 at the stove station).

Note that referring to simply "print data" below means print data for an order preparation ticket. Referring to simply a "printer" means a kitchen printer 4.

The print control unit 320 includes a print job generator 321 and a redirection controller 322.

Figure 6:
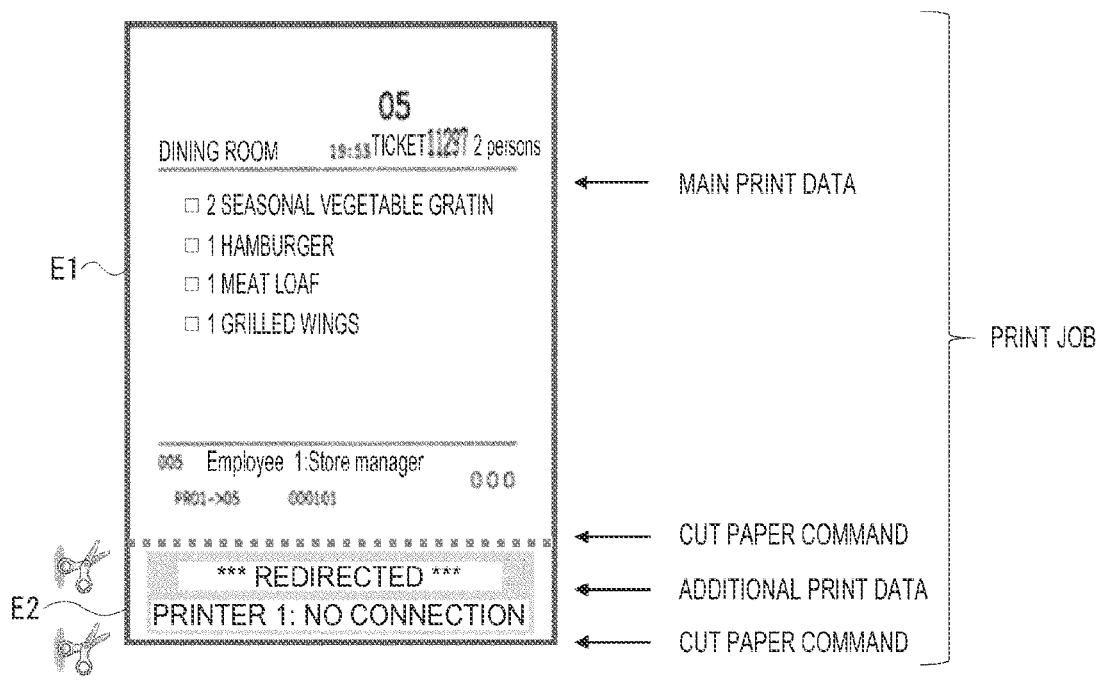
FIG. 6 shows an example of a print job the interface board generates.

The print job generator 321 generates a print job as shown in FIG. 6 when redirection control is applied. More specifically, the print job generator 321 generates a print job by adding additional print data indicating the print data has been redirected after the print commands of the main print data (the print data for a grill order preparation ticket in this example), which is the print data the reception unit 310 receives, and before the cut paper command; and adding a cut paper command between the main print data and the additional print data. In the example shown in FIG. 6, the print job is generated so that the print area E2 of the additional print data is located after the print area E1 of the main print data, but the positions may be reversed.

Note that the cut paper command is not limited to a full cut command, and may instruct a partial cut leaving a single uncut portion, a partial cut leaving multiple uncut portions, or a perforation. The user can select and set the type of paper cut, and save the setting in the internal memory 32 as part of the printer registry information.

The additional print data indicates by text or images additional information including a redirect message indicating redirection, identification information causing the printer to which the print data is redirected (second printing device, other printing device) to print the identifier of the source printer from which the print data is redirected (first printing device, particular printing device), and status information causing the second printer to print the status of the source printer. In the example shown in the figure, the redirect message (¥/¥/¥/REDIRECTED ¥/¥/¥/), identification information (PRINTER 1), and status information (NO CONNECTION) are expressed by text. This additional information (redirect message, identification information, and status information) may also be expressed as an image or a combination of text and image.

The print job generator 321 also applies decoration to the additional print data to differentiate it from the main print data. In the example in the figure, shading is added to substantially all of the print area E2 of the additional print data. Alternatively, the font type, size, color, or style of strings contained in the additional print data may be changed or added. Further alternatively, a border may be added around the print area E2 of the additional print data, a watermark may be printed to the print area E2, or a specific mark may be printed in the print area E2.

Referring again to FIG. 4, when a particular printer to which the print data is directed for printing is unable to print, the redirection controller 322 applies redirection control to send the print data to a printer other than the intended (first, source) printer. The redirection controller 322 sends the print job generated by the print job generator 321 (a print job including the main print data and additional print data) to the second printer. If redirection is not required, the print control unit 320 sends only the main print data to the destination printer.

Note that "unable to print" means that a printer error has occurred or the printer is busy.

Possible errors include a roll paper cover open error (the roll paper cover 43 (FIG. 15) is open), an overheated printhead error (the temperature of the printhead 45 exceeds a threshold temperature), a cutter error (a problem with the paper cutter 47), a memory read/write error (the internal memory 32 does not operate properly after a read/write check), a voltage error (the power supply voltage is too high or too low), a CPU runtime error (the CPU accesses an illegal address), an internal circuit connection error (an internal circuit connection is not right), and an interface error (there is an interface problem).

The printer unit 3b also has a print unit 330. The print unit 330 prints based on the order ticket print data received by the reception unit 310. In this embodiment, the print unit 330 of the printer unit 3b is not subject to redirection control.

The kitchen printer 4 also has a print unit 410. This print unit 410 prints based on the order preparation ticket print data received by the reception unit 310 or the print job generated by the print job generator 321. More specifically, the print unit 410 prints the print job generated by the print job generator 321 when a print job is redirected to the print unit 410, and prints the order preparation ticket print data (the main print data) when a print job is not redirected to the print unit 410.

Figure 7:
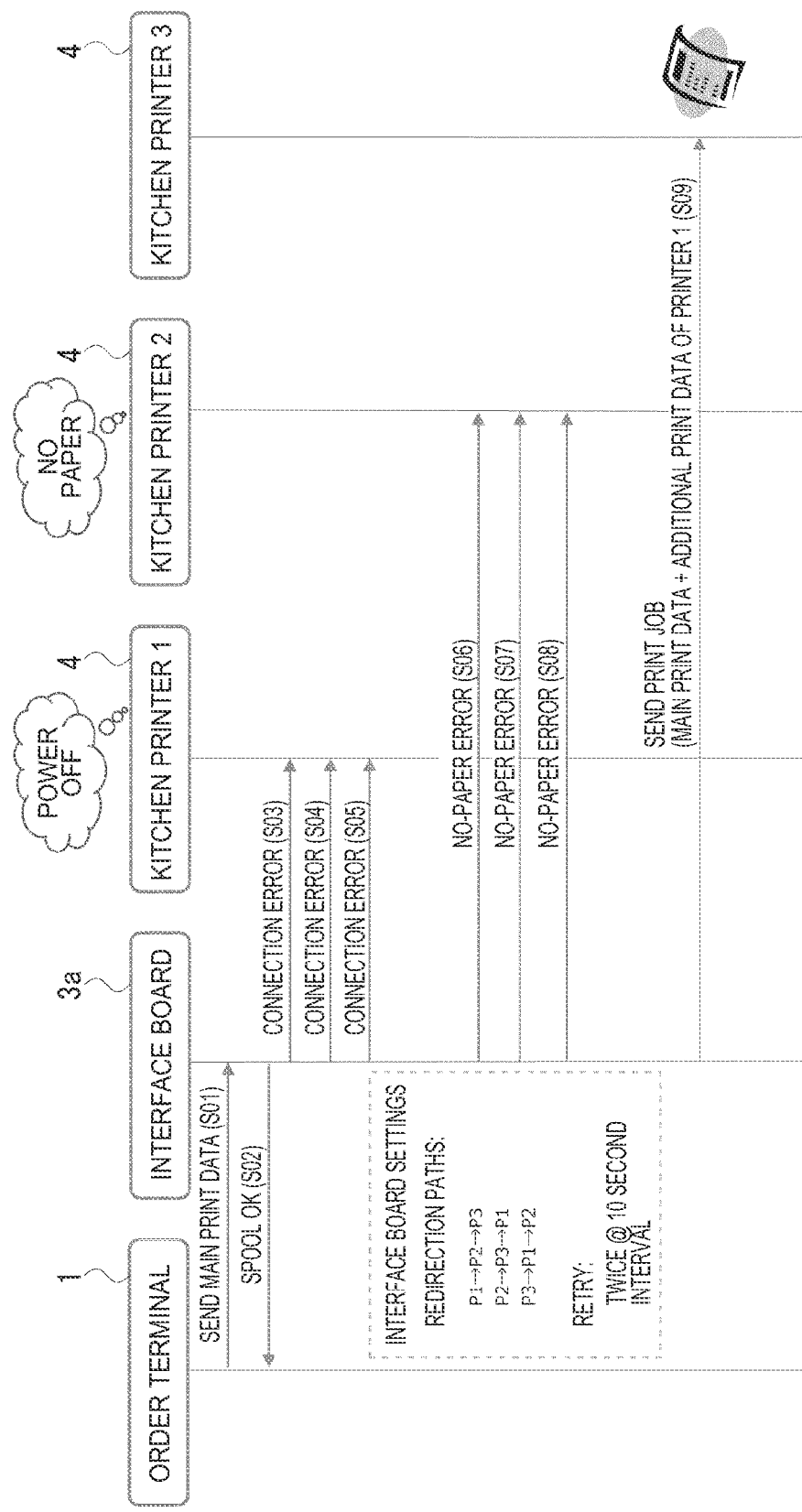
FIG. 7 is a sequence diagram showing an example of the complete printing process of the order entry system.
Figure 8:
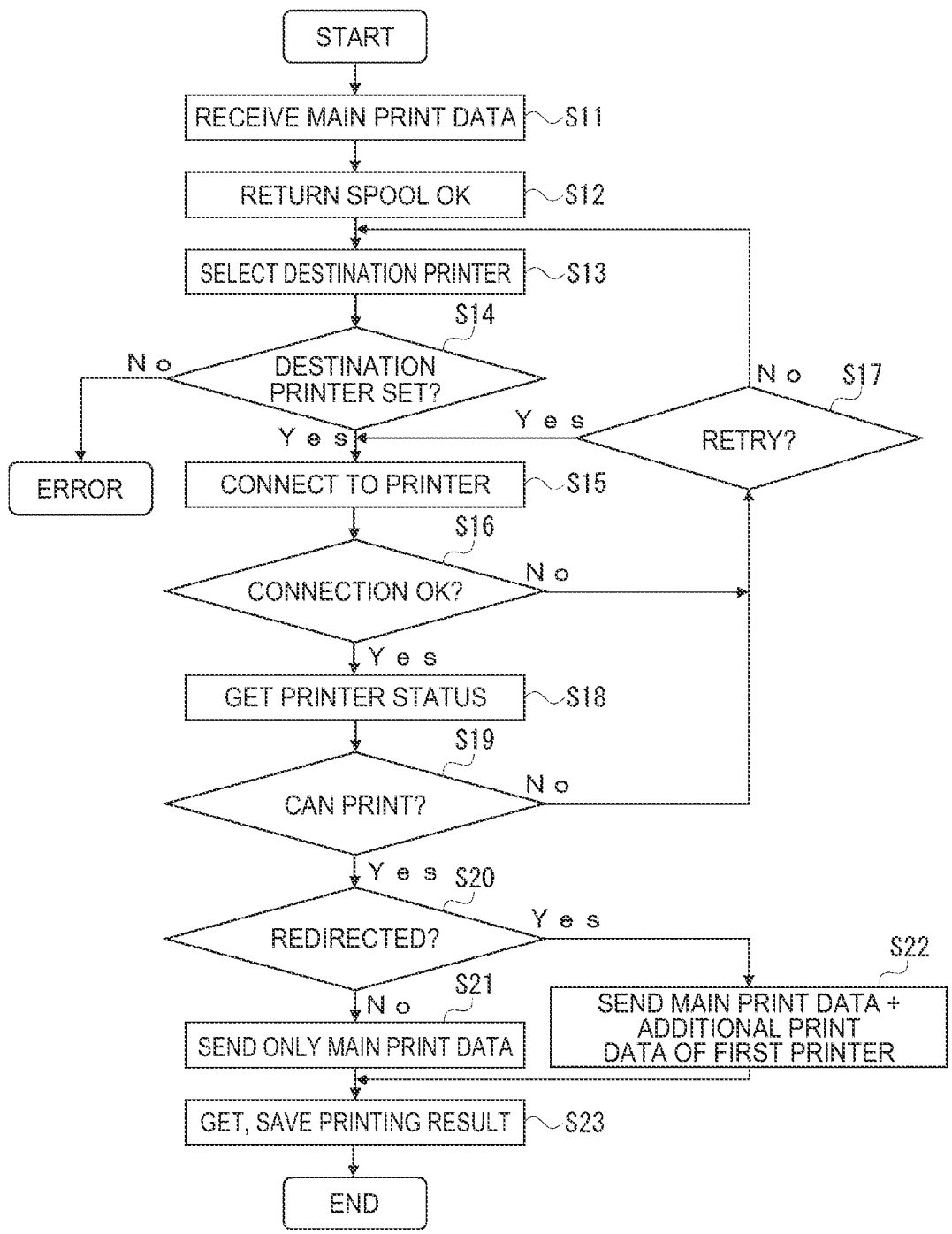
FIG. 8 is a flow chart of redirection control by the interface board.
Figure 9:
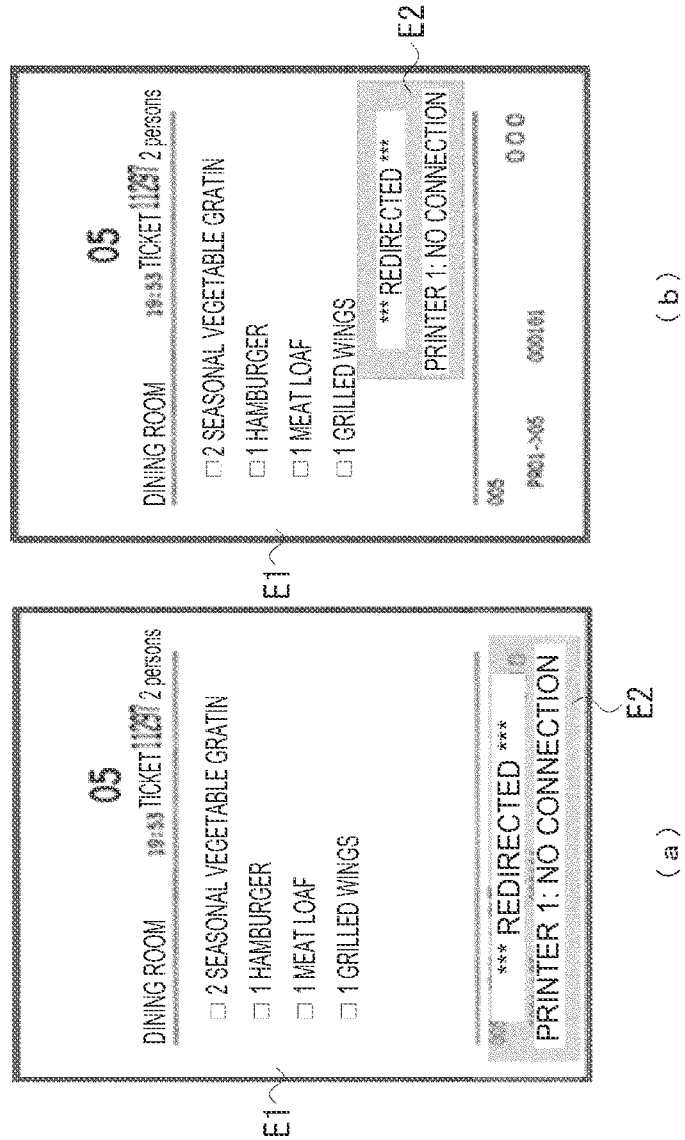
FIGS. 9 (a) and (b) show examples of print jobs in variation 1-1.

The flow of the printing process is described next with reference to FIG. 7 and FIG. 8. FIG. 7 is a sequence diagram showing the operation of the overall order entry system SY, and FIG. 9 is a flow chart showing the operation of primarily the interface board 3a. As indicated by the dotted border in FIG. 7, redirection paths and retry settings are previously registered in the interface board 3a.

For example, if the kitchen printer 4 identified by the destination printer code (FIG. 5) is printer 1 (P1), the redirection path is printer 2 (P2) and then printer 3 (P3); if the identified kitchen printer 4 is printer 2 (P2), the redirection path is printer 3 (P3) and then printer 1 (P1); and if the identified kitchen printer 4 is printer 1 (P3), the redirection path is printer 1 (P1) and then printer 2 (P2).

The retry setting in this example includes a command transmission interval (in the example in the figure, 10 seconds), and a retry count (in this example, twice).

Note that the redirection paths and retry settings can be set as desired by the user. Methods of making these settings include by accessing the web server of the interface board 3*a* through a web browser, calling a web API and sending configuration information to the URL of the interface board 3*a* for configuring settings, and storing the settings in USB memory or other storage device and causing the interface board 3*a* to read the settings from the USB memory, for example.

As shown in the figure, when the order terminal 1 sends the main print data (print data for a grill order preparation ticket) to the interface board 3*a* (S01), the interface board 3*a* receives the main print data and returns SPOOL OK to the order terminal 1 that sent main print data (S02). Based on the destination printer code added to the received main print data, the interface board 3*a* tries to send data to the printer that is addressed first, printer 1 in this example. If, for example, a connection error occurs (S03), the interface board 3*a* tries twice more at 10-second intervals based on the retry settings (S04, S05).

If sending the print data is still unsuccessful after retrying, the interface board 3*a* follows the redirection path and tries to send data to the first redirect address (the second printer address) (printer 2 in this example). If there is a no-paper error, for example, (S06), the interface board 3*a* tries resending according to the retry setting (S07, S08). If sending the print data is still unsuccessful after retrying, the interface board 3*a* follows the redirection path and tries to send data to the second redirect address (the third printer address) (printer 3 in this example).

If the printer 3 can print, the interface board 3*a* sends the print job generated by the print job generator 321 (a print job adding the additional print data for printer 1 to the main print data) (S09). The interface board 3*a* thus adds only the additional print data related to the first printer destination (printer 1) to the main print data even when the print data is redirected twice, first to printer 2 and then to printer 3.

The operation of the interface board 3*a* is described next with reference to the flow chart in FIG. 8.

When the main print data is received from the order terminal 1 (S11), the interface board 3*a* returns SPOOL OK (S12) and selects the kitchen printer 4 to address (S13). The interface board 3*a* selects the first destination printer based on the destination printer code, and selects the second and further printers based on the redirection path.

If in S13 there is no kitchen printer 4 to address (S14: No), an error results. If there is a kitchen printer 4 to address (S14: Yes), the interface board 3*a* tries to connect to that kitchen printer 4 (S15), and if connection is not successful (S16: No), determines whether or not to try again based on the retry setting (S17). If the interface board 3*a* tries again (S17: Yes), it returns to S15. If it does not try again (S17: No), it returns to S13 and selects the printer to which to redirect.

If connection is successful in S16 (S16: Yes), the interface board 3*a* gets the status of the kitchen printer 4 (S18). If the kitchen printer 4 is unable to print (S19: No), the interface board 3*a* determines whether or not to try again based on the retry setting (S17). If the kitchen printer 4 can print (S19: Yes), the interface board 3*a* determines if the print data was redirected (S20). If printing was not redirected (S20: No), the interface board 3*a* sends only the main print data received in S01 to the selected kitchen printer 4 (S21). If printing was redirected (S20: Yes), the interface board 3*a* adds the additional print data of the kitchen printer 4 to which data was sent first to the main print data received in 901, and sends the new print job to the kitchen printer 4 selected as the redirected destination (S22). After S21 or S22, the interface board 3*a* gets the result of printing from the kitchen printer 4 to which the print data was sent, and saves it in the storage device 34 (S23).

As described above, because additional print data indicating the status of the kitchen printer 4 from which print data is redirected (the first printer) is sent to the kitchen printer 4 to which the print data is redirected (the second printer) during redirection control, the user can know from the printout by the second kitchen printer 4 why print data was redirected from the first kitchen printer 4.

Furthermore, because the identifier of the source (first) kitchen printer 4 is contained in the additional print data, the kitchen printer 4 that must be reset can be easily determined even when there are three or more kitchen printers 4 subject to redirection control. Furthermore, because the interface board 3*a* generates the print job, there is no need to change the order terminal 1 (change or replace the application) and the control load of the kitchen printers 4 can be reduced.

Some variations of this embodiment of the disclosure are described below.

Variation 1-1

The print job generator 321 may generate print jobs so that the printed length including the additional print data added to the main print data is the same as the length printed when printing only the main print data. Such print jobs may be produced by, for example, superimposing the print area E2 of the additional print data on the print area E1 of the main print data as shown in FIG. 9 (*a*). In this event, as shown in (*b*), white space may be found in the print area E1 of the main print data, the additional print data reduced to the size of the white space, and the shrunken additional print data added to the main print data. The method of this embodiment does not consume additional paper to add the additional print data (when redirection control is required), and therefore helps conserve resources.

Variation 1-2

When a print job is redirected multiple times (such as when the first and second printing devices cannot print), the redirection controller 322 may send additional print data containing information about all printers that could not print to the destination printer. This method enables the user to know that multiple printers cannot print, and as a result can quickly take action to reset each printer.

Variation 1-3

The step of the print job generator 321 generating a print job may be omitted. In this event, the print control unit 320 (redirection controller 322) sends additional information (a status code indicating the status of the source printer, and the identification code of the source printer) together with the main print data to the destination printer. The printer (kitchen printer 4) receiving this additional information then functions as an additional print data generator, generates additional print data including a status message (such as the string NO CONNECTION) converting the status code to text or an image, and an identifier (such as the string PRINTER 1) converting the identification code to text or an image, and prints the additional print data with the main print data. Thus comprised, the interface board 3*a* sends only the status code and identification code as the additional information, and can reduce the amount of transmitted data when compared with sending the additional print data as described in the first embodiment above. The printing format (decoration and printing position) of the additional print data can also be customized for each kitchen printer 4.

Variation 1-4

The retry settings (inside the dotted line in FIG. 7) may also be configured conditionally upon the type of error. For example, print data may be immediately redirected without retrying if there is a fatal error. Fatal errors include, for example, memory read/write errors, voltage errors, CPU runtime errors, internal circuit connection errors, and interface errors.

Variation 1-5

Error handling information indicating how to handle the status information (the status of the source printer) may also be included in the additional print data. This enables users unfamiliar with printer operation to take appropriate action.

Variation 1-6

The printer unit 3b of the smart printer 3 for taking orders and the print unit of the smart printer 5 for printing receipts may also be included in the printers used for redirection. Further alternatively, redirection may be limited to a subset of the kitchen printers 4 instead of using all connected kitchen printers 4. Further alternatively, the user may select the printers that may be source and/or destination printers for redirection. This is convenient because the printers used for redirection control can be specified according to the scale of the business or the system configuration.

Embodiment 2

A second embodiment of the disclosure is described next with reference to FIG. 10 to FIG. 12. The first embodiment above determines the printer to which data is redirected according to the redirection path previously registered in the interface board 3a. This embodiment of the disclosure determines the destination printer based on the order content of the print data. In addition, if unprinted print data is stored in the storage device 34 when the smart printer 3 is turned on, the smart printer 3 resumes printing the unprinted data. The differences with the first embodiment are described below. Note also that like parts in this and the first embodiment are identified by like reference numerals, and further detailed description thereof is omitted. Variations applicable to like parts in the first embodiment are also applicable to this embodiment.

Figure 10:
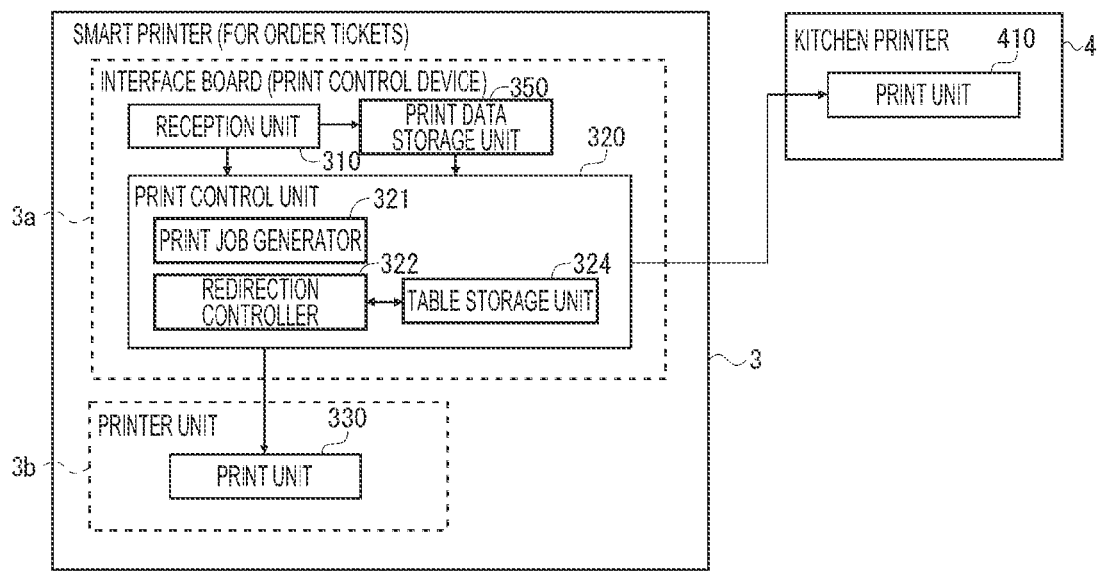
FIG. 10 is a block diagram showing the function of an interface board according to a second embodiment of the disclosure.

FIG. 10 is a block diagram showing the functional configuration of the interface board 3a in this second embodiment of the disclosure. The interface board 3a according to this embodiment has a print data storage unit 350 in addition to the components of the first embodiment shown in FIG. 4, and a table storage unit 324 in the print control unit 320.

The print data storage unit 350 nonvolatilely stores the received print data (print data for order preparation tickets and print data for order tickets), and is embodied by the storage device 34 (see FIG. 2).

When unprinted data (print data for order preparation tickets) is stored in the print data storage unit 350 when the printer turns on, for example, the print control unit 320 in this embodiment tries sending the unprinted data to the kitchen printer 4 identified by the destination printer code added to the print data. If the kitchen printer 4 cannot print, the print control unit 320 redirects the print data.

Note that when unprinted data for order tickets is stored in the print data storage unit 350 when the printer turns on, the print control unit 320 sends the unprinted data to the printer unit 3b.

The table storage unit 324 nonvolatilely stores a printing device table as shown in FIG. 11, and a redirection control table as shown in FIG. 12, and is embodied by the internal memory 32 (FIG. 2).

As shown in FIG. 11, the printing device table relationally stores the unique address assigned to each printer and one or more destination printer codes for each printer (kitchen printer 4) used for redirection. The IP address may be used as the address, but simple numeric strings such as 0001 are used in the example in the figure.

The destination printer code is related to the particular menu (order) items (order content) by the order terminal 1. For example, the destination printer code linked to GRILL DISH A is added to the print data for an order preparation ticket for the menu item GRILL DISH A.

As shown in FIG. 12, the redirection control table is a table relating each destination printer code to a redirection path. The redirection path is defined by the order of the printer addresses (information including the address of the first destination printer, the address of the first printer for redirection, and so forth to the address of the last printer for redirection).

The print control unit 320 (redirection controller 322) in this embodiment determines where to direct the print data (the redirection path) based on the printing device table and the redirection control table. For example, if printer 1 can print, and the destination printer code PRa is added to the print data for order preparation ticket for GRILL DISH A, the print control unit 320 sets 0001 as the destination based on the printing device table.

If printer 1 cannot print, the redirection path is determined as described below by referencing the redirection path table. For example, if the destination printer code PRa is added to the print data for order preparation ticket for GRILL DISH A, the print control unit 320 sets the redirection path to 0001->0002->0003. If the destination printer code PRb is added to the print data for order preparation ticket for GRILL DISH B, the print control unit 320 sets the redirection path to 0001->0003->0002. In both cases, printer 1 at the address 0001 is set as the first destination, but the redirection paths differ because the destination printer codes differ. The print control unit 320 can thus determine the redirection path (destination) for redirection control according to the order content in the print data.

Because the redirection path is determined according to order content in the print data when redirection is required, this embodiment of the disclosure can redirect print data to the kitchen printer 4 appropriate to the individual order items in the group of kitchen printers 4 used for redirection control. For example, when GRILL DISH A is a set menu including a grilled item and a fried item, and GRILL DISH B is a set menu including a grilled item and a stove item, and the print data for an order preparation ticket for GRILL DISH A cannot be printed by the printer 1 for the grill, the print data is redirected to the printer 2 for the fryer. Likewise, if the print data for an order preparation ticket for GRILL DISH B cannot be printed by the printer 1 for the grill, the print data is redirected to the printer 3 for the stove. By thus changing where print data is redirected based on the combination of the set menu items, the kitchen staff can adjust the finish time of the set menu items and efficiency can be improved. Furthermore, because print data can be redirected to different printers, increasing the control load on a specific printer as a result of redirection control can be prevented.

Furthermore, because plural destination printer codes can be related to a single printer in the printing device table, redirection can be changed according to the order content without changing the configuration (application) of the order terminal 1.

Furthermore, because the interface board 3a in this embodiment has a print data storage unit 350 that nonvolatilely stores the received print data, the printing process can be reliably resumed if the power is turned off before the printing process ends. As a result, problems such as orders being lost because preparation of an order did not start due to an error or problem with a kitchen printer 4 can be prevented.

Some variations of this embodiment are described below.

Variation 2-1

If the order terminal 1 does not add a destination printer code to the print data, the interface board 3a (print control unit 320) may determine the order content by analyzing the print data, and set the redirection path (change the redirection) according to the order content. Furthermore, when the disclosure is not applied to an order entry system SY, the redirection path may be determined according to the printed content of the print data (such as whether or not a specific string or specific command is contained in the print data, or the number of specific strings or specific commands in the print data).

Variation 2-2

The redirection path may also be determined according to the status of the redirection source instead of the order content of the print data. For example, the print data may be redirected to a printer used by the manager or other person familiar with printer operation if an unrecoverable, fatal error occurs in the source printer, and redirection may be controlled according to a redirection path appropriate to the order content in the event of non-fatal errors. Because the manager or other knowledgeable person can thus quickly know a fatal error occurred, the error can be quickly and reliably addressed.

Embodiment 3

A third embodiment of the disclosure is described next with reference to FIG. 13 to FIG. 18. This embodiment is characterized by enabling setting the printing format of the additional print data. The differences with the first and second embodiments are described below. Note also that like parts in this and the first and second embodiments are identified by like reference numerals, and further detailed description thereof is omitted. Variations applicable to like parts in the first and second embodiments are also applicable to this embodiment.

Figure 13:
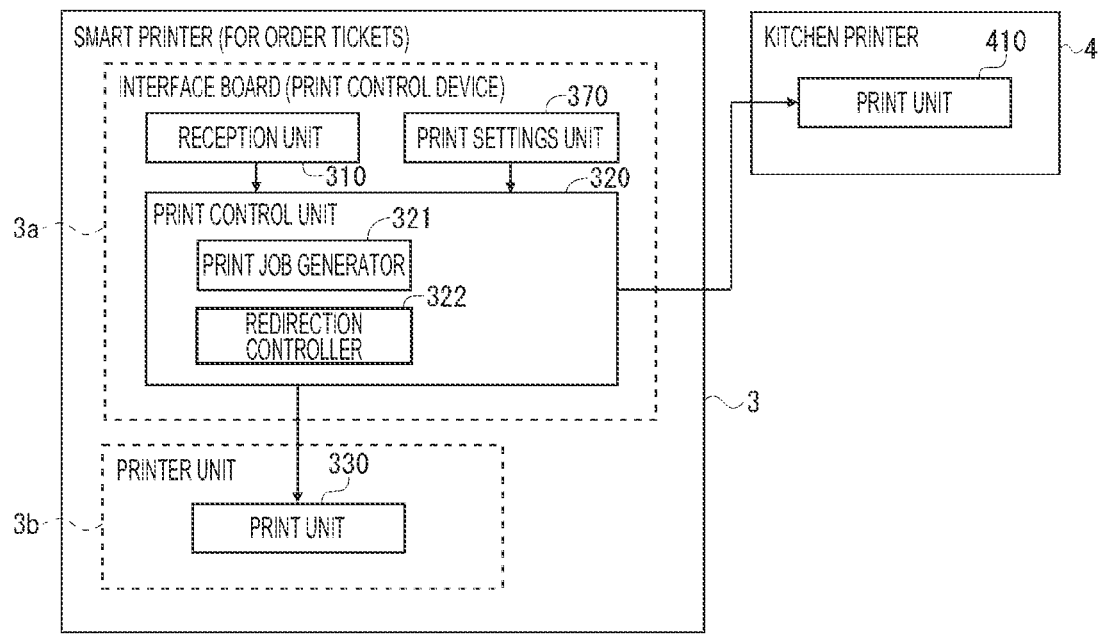
FIG. 13 is a block diagram showing the function of an interface board according to a third embodiment of the disclosure.

FIG. 13 is a block diagram showing the functional configuration of the interface board 3a in this third embodiment. The interface board 3a according to this embodiment has a print settings unit 370 in addition to the components of the first embodiment shown in FIG. 4.

The print settings unit 370 sets print parameters such as the printing direction and printing position of the additional print data added to the main print data during redirection control. FIG. 14 shows an example of a redirection control setup screen D1 for configuring printing. Included in the redirection control setup screen D1 are five settings, the redirection message, printing direction, printing position, paper cut, and style (decoration). The redirection message is selected from among plural message candidates. The redirection message may also be input through a text input field.

The printing direction sets the orientation of the additional print data relative to the direction in which the paper is discharged, and is either normal or reversed. When set to normal, text is printed in the normal upright position relative to the paper discharge direction. When set to reversed, text is printed reversed relative to the paper discharge direction.

The printing position determines where the additional print data is printed relative to the main print data, and is either before or after in this example. When set to before, the additional print data is printed before the main print data. When set to after, the additional print data is printed after the main print data.

The cut paper setting determines whether or not to cut the paper between the main print data and additional print data, and is set to either yes or no. When set to yes, the paper is cut between the main print data and additional print data, and when set to no, the paper is not cut between the main print data and additional print data. The interface board 3a decides to add or not add a cut paper command between the main print data and additional print data based on the cut paper setting. Options for the type of cut, such as a full cut or partial cut, could also be provided when the paper cut setting is yes.

The style setting sets any decoration to be applied to the additional print data, and in this example include bold, underline, double width, double height, and rotate. Other decoration is also possible, including adding a frame around the print area E2 of the additional print data, printing a watermark, and printing a specific image.

When these settings are made in the redirection control setup screen D1 and the Apply button 51 is clicked, the settings are confirmed. Note that the redirection control setup screen D1 is displayed by the web browser when a web browser is used to access the web server of the interface board 3a to configure the settings. Alternatively, the redirection control setup screen D1 is displayed by the web API when a web API is called to send the settings to a specific URL on the interface board 3a. Further alternatively, when the settings are stored in USB memory or other storage device and the interface board 3a is controlled to read the settings from the USB memory, the redirection control setup screen D1 may be displayed by an application running a computer (such as a PC or tablet device) with the ability to write to USB memory.

In this embodiment of the disclosure, the print settings unit 370 (redirection control setup screen D1) sets the print settings at one time for all kitchen printers 4 (printer 1, printer 2, and printer 3 in this example) that may be the source or destination printer for redirection control. When the print control unit 320 (redirection controller 322) in this embodiment redirects print data, it adds the additional print data based on the settings in the print settings unit 370 to the main print data.

Figure 16:
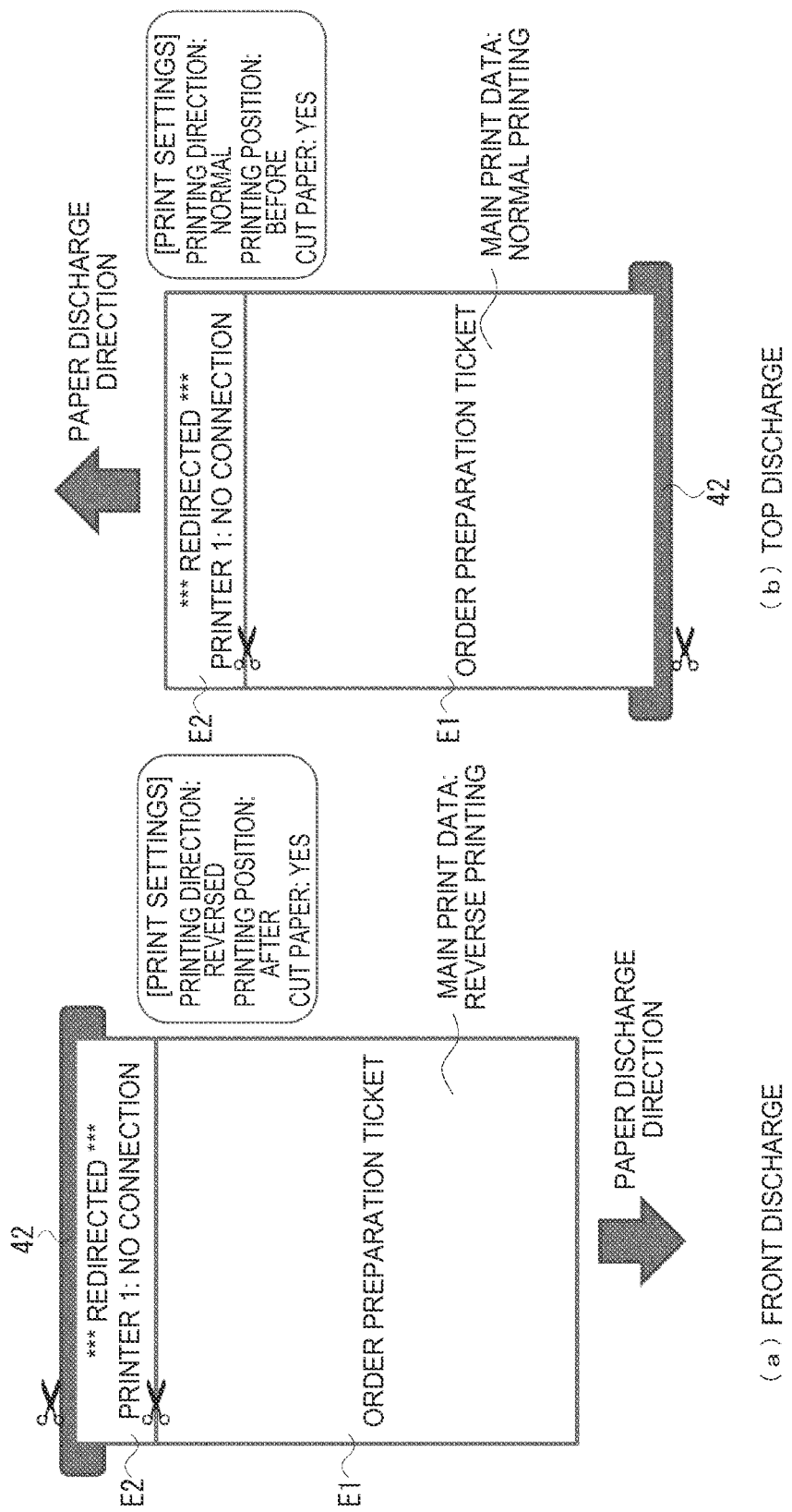
FIG. 16 (a) shows an example of a printout suited to front discharge, and (b) shows an example of a printout suited to top discharge.

The settings of the print settings unit 370 and the printouts resulting from those settings are described further below with reference to FIG. 16 and FIG. 17. FIG. 16 (a) shows a sample printout suited to front discharge, and (b) shows a sample printout suited to top discharge.

Figure 15:
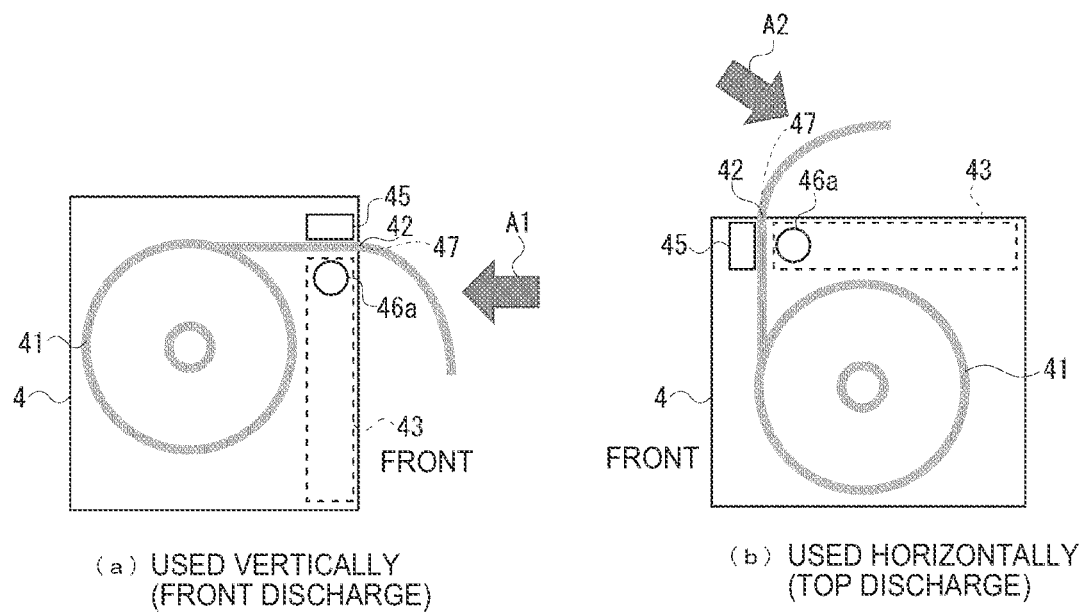
FIG. 15 (a) illustrates the direction of paper discharge when the kitchen printer is set vertically, and (b) illustrates the direction of paper discharge when the kitchen printer is set horizontally.

The orientation of the kitchen printer 4 is described first with reference to FIG. 15. FIG. 15 illustrates a kitchen printer 4 that can be placed a vertical or a horizontal position. FIG. 15 (a) shows the kitchen printer 4 placed vertically, and (b) shows the kitchen printer 4 placed horizontally. Shown in the figures are the roll paper 41, paper exit 42, roll paper cover 43, printhead 45, paper conveyance mechanism 46, and paper cutter 47. The platen roller 46a is disposed to the roll paper cover 43, and after the user opens the roll paper cover 43, drops in the roll paper 41, and then closes the roll paper cover 43, the printhead 45 and platen roller 46a are opposite each other and the printer can print.

When the kitchen printer 4 is used in the vertical position as shown in (a), paper is discharged from the front. If the printing direction of the additional print data is set to reversed as shown in FIG. 16 (a), order preparation tickets discharged from the front of the printer (arrow A1 in FIG. 15 (a)) can be easily read in the normal orientation by the kitchen staff from the front of the printer. Because the printing direction of the main print data is set by the order terminal 1, it cannot be edited by the interface board 3a (print control unit 320). The printing position and cut paper settings can be set as needed by the user, and FIG. 16 (a) illustrates a sample printout when the printing position is After and the cut paper setting is Yes.

When the kitchen printer 4 is used horizontally as shown in FIG. 15 (b), the paper is discharged from the top. In this case, if the printing direction of the additional print data is Normal, order preparation tickets discharged from the printer (arrow A2 in FIG. 15 (b)) can be easily read in the normal orientation by the kitchen staff from the top front side of the printer. FIG. 16 (b) illustrates a sample printout when the printing position is Before and the cut paper setting is Yes.

Note that the print settings may be set according to the application and not only according to the direction paper is discharged. For example, FIG. 17 (a) shows an example of printing a sales receipt. This example anticipates the printer (the smart printer 5 for sales receipts, see FIG. 1) being placed vertically, the operator standing in front of the printer (the direction of arrow A1 in (FIG. 15 (a)), and the customer on the other side facing the operator (printer). In this situation, the additional information is presented in the normal reading direction for the operator if the additional print data is reversed as shown in the figure. However, because the main print data is printed normally, there is no need to turn the sales receipt around when giving the sales receipt to the customer, which is convenient. FIG. 17 (a) shows a sample printout when the printing position of the additional print data is Before and the cut paper setting is Yes.

Figure 17:
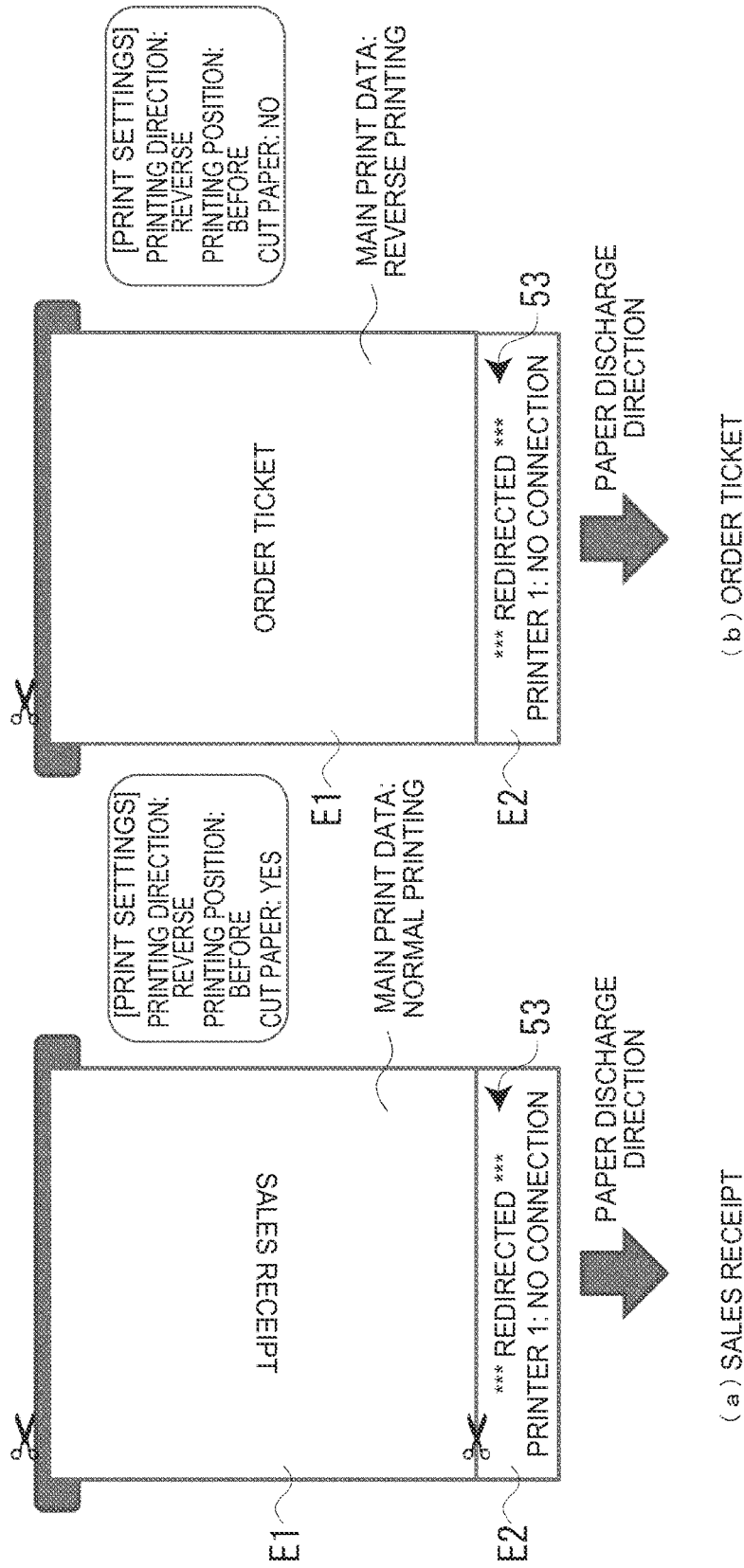
FIG. 17 (a) shows an example of the result of printing a sales receipt, and (b) shows an example of the result of printing an order ticket.

FIG. 17 (b) shows an example of printing an order ticket. This example anticipates the printer (the smart printer 3 for order tickets, see FIG. 1) being placed vertically, and the operator in front of the printer (the direction of arrow A1 in (FIG. 15 (a)). By printing the order ticket and additional information normally in this case, text is printed normally and is easy for the waitstaff to read. Furthermore, because the printing position of the additional print data is set to Before, that the print data was redirected can be known as soon as printing starts. Furthermore, because the cut paper setting is No, the printout can be prevented from falling and being lost, for example.

Also note that when the printing position is set to Before as in the examples shown in FIGS. 17 (a) and (b), the triangular marks in the redirection message 53 (the three ¥/marks on the right and left sides (total of six) of the REDIRECTED string in FIGS. 16 (a) and (b)) change to upward-pointing triangles. This is so that the triangle marks point to the location of the redirected print data. More specifically, when down-pointing triangles are included in the selected redirection message, and the printing position is set to Before, the print control unit 320 edits and changes the orientation of the triangles from pointing down to pointing up. The marks that may be edited are not limited to triangular marks, and may be any mark that indicates directionality, such as arrows. When marks that point up are included in the set redirection message, and the printing position is set to After, marks that point up may be edited to point down.

As described above, this embodiment of the disclosure enables the user to change the printing format of the additional print data as desired. For example, by matching the printing direction of the additional print data to the printing direction of the main print data, the additional print data may be intentionally reversed. The additional print data may also be printed before or printed after the main print data.

Because the print settings unit 370 can set the print settings for all printers subject to redirection control in a single batch, the efficiency of setting the print settings increases as the number of printers. The risk of setting errors can also be reduced when compared with individually inputting the settings for each printer.

Some variations of this embodiment are described below.

Variation 3-1

The printing direction of the additional print data and the printing direction of the main print data may also be set separately by the print settings unit 370. In this event, there is no need to change the configuration (application) of the order terminal 1, and the printing direction of the additional print data and the printing direction of the main print data may be set as desired by the user. The format (style) of the main print data may also be set in the same way as the additional print data.

Variation 3-2

All printers used for redirection control may also be grouped by model, and the print settings set according to the model by the print settings unit 370. Because the appropriate print settings may differ according to the model, such as the printing direction appropriate for a front-discharge printer and the printing direction for a top-discharge printer, setting the print settings by model (type) is effective when different models of printers are used in redirection control. Note that because the printing format of the additional print data may differ according to the destination printer, regenerating the print job may be required each time the destination changes.

Variation 3-3

Figure 18:
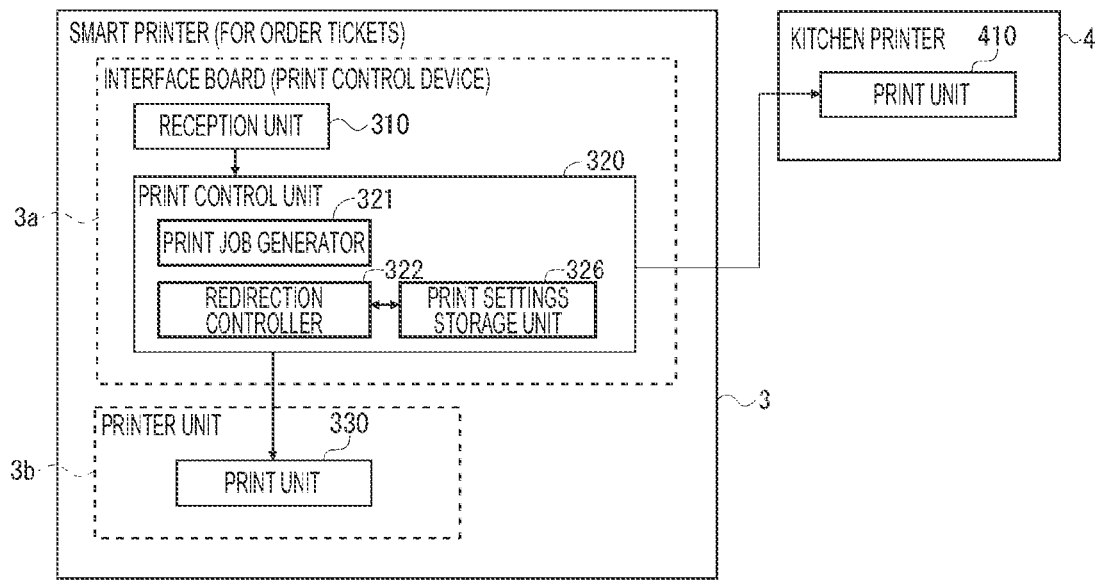
FIG. 18 is a block diagram showing the function of an interface board according to variation 3-3 of the disclosure.

The print settings unit 370 may also be omitted. FIG. 18 shows the functional configuration of an interface board 3a according to this example. The interface board 3a in this example omits the print settings unit 370 from the configuration of the third embodiment described above (FIG. 13), but includes a print settings storage unit 326 in the print control unit 320. The print settings storage unit 326 stores print settings appropriate to each printer used in redirection control. In this event, the print settings may be stored by model or individually by printer. The print settings may also be stored rewritably or not rewritably. The print control unit 320 (redirection controller 322) in this example references the print settings storage unit 326 for redirection control, and sends additional print data based on the print settings related to the destination printer with the main print data. This method eliminates the need for the user to manually configure the print settings, and enables appropriately setting the printing format of the additional print data according to the printer.

In printers that can be used in different orientations such as described above, print settings appropriate to the installation may also be made by the print control unit 320. In this event, the printer detects the orientation by means of an acceleration sensor, for example, and outputs the result to the interface board 3a. The interface board 3a (print control unit 320) then sets the printing direction of the additional print data according to the orientation acquired from each printer. In this example, the printing direction of the additional print data can be set according to the orientation of the printer. This variation may also be combined with variation 3-1 described above to set the printing direction of the additional print data and the main print data according to the orientation of the printer.

Variation 3-4

Additional print data may also be added both before and after the main print data instead of only before or only after the main print data. This enables reliably differentiating redirected order preparation tickets when plural order preparation tickets are printed continuously.

Variation 3-5

When directional markers (such as the triangle marks described above) are not included in the redirection message, a positioning image that indicates the location of the redirected print data may be added. Further alternatively, a positioning image may be printed as part of the additional print data irrespective of the content of the redirection message. This enables reliably differentiating the redirected order preparation tickets when plural order preparation tickets are printed continuously.

Three embodiments and variations thereof are described above, but elements of the order entry systems SY (particularly the interface boards 3a) described in the preceding embodiments and variations can also be provided as a program. This program can also be provided stored on a suitable recording medium, such as CD-ROM or flash memory. More specifically, a program causing a computer to function as the elements of the order entry systems SY described above, and a recording medium storing the program, are also included in the technical scope of the disclosure.

The print control device of the disclosure is described as an interface board 3a installed in a smart printer 3 above, but may also be embodied by a device separate from the smart printer 3 for printing order tickets.

Furthermore, if a print data supply device that supplies print data has a printer driver, the print control device of the disclosure may also be embodied by the printer driver.

The print control device of the disclosure may also be applied to printing systems other than an order entry system SY.

The print medium is also not limited to continuous print media, and may be cut-sheet paper.

The print control device of the disclosure may also be embodied using cloud computing technology.

The disclosure being thus described, it will be obvious that it may be varied in many ways. Such variations are not to be regarded as a departure from the spirit and scope of the disclosure, and all such modifications as would be obvious to one skilled in the art are intended to be included within the scope of the following claims.

What is claimed is:

1. A print control device comprising:
a receiver that receives print data; and
a print controller that, when a first printing device that is the first print destination of the print data is unable to print, applies redirection control to send the print data to a second printing device different from the first printing device, and
  sends the print data and additional information to the second printing device during redirection control,
  the additional information including a status code indicating the status of the first printing device, an identification code of the first printing device, and information causing the second printing device to print the status of the first printing device,
  wherein the second printing device generates additional print data including a status message converting the status code to text or an image, and an identifier converting the identification code to text or an image.

2. The print control device described in claim 1, wherein:
the additional information includes identification information causing the second printing device to print an identifier of the first printing device.

3. The print control device described in claim 2, wherein:
the print controller generates a print job for redirection control by adding additional print data expressing the additional information by text or image to main print data, which is the print data the receiver receives, and sends the print job to the second printing device.

4. The print control device described in claim 3, wherein:
the print job includes a cut paper command to cut the paper between the main print data and the additional print data.

5. The print control device described in claim 3, wherein:
the print controller adds decoration differentiating the additional print data from the main print data to the additional print data.

6. The print control device described in claim 3, wherein:
the print controller generates the print job so that the printed length of the additional print data and the main print data is the same as the printed length when printing only the main print data.

7. The print control device described in claim 1, wherein:
when the second printing device is unable to print, the print controller sends the print data the receiver received, the additional information of the first printing device, and the additional information of the second printing device to a third printing device that is different from the first printing device and the second printing device.

8. The print control device described in claim 1, wherein:
the receiver receives print data for order content; and
the print controller determines the redirection path for redirection control according to the order content in the print data.

9. The print control device described in claim 1, further comprising:
a print settings interface that configures print settings including the printing direction of the additional information;
the print controller sending the additional information added to the print data during redirection control, based on a setting of the print settings interface.

10. The print control device described in claim 9, further comprising:
a print settings storage that stores print settings of a first printing device and second printing device used in redirection control; and
the print controller referencing the print settings storage in redirection control, and sending additional information added to the print data, based on a print setting of the second printing device.

11. A printing system comprising:
a print data supply device;
a print control device; and
multiple printing devices including a first printing device and a second printing device;
the print control device including a receiver that receives print data from the print data supply device, and
a print controller that, when the first printing device that is the first print destination of the print data is unable to print, applies redirection control to send the print data to the second printing device different from the first printing device, and
  sends the print data and additional information to the second printing device during redirection control, the additional information including a status code indicating the status of the first printing device, an identification code of the first printing device, and information causing the second printing device to print the status of the first printing device, wherein the second printing device generates additional print data including a status message converting the status code to text or an image, and an identifier converting the identification code to text or an image.

12. The printing system described in claim 11, wherein:

the second printing device includes an additional print data generator that generates the additional print data, and a print unit that adds and prints the additional print data with main print data, which is the print data sent from the print control device.

13. The printing system described in claim 11, wherein:

receiver of the print control device receives print data indicating order content from the print data supply device; and the print controller of the print control device determines the redirection path for redirection control according to the order content in the print data.

14. The printing system described in claim 11, wherein:

the print control device includes a print settings interface that configures print settings including the printing direction of the additional information;

the print controller of the print control device sending the additional information based on a setting of the print settings interface added to the print data during redirection control.

15. A control method of a print control device, comprising:

receiving print data by a receiver; and when a first printing device that is the first print destination of the print data is unable to print, applying, by a controller, redirection control to send the print data to a second printing device different from the first printing device, and sending the print data and additional information to the second printing device during redirection control, the additional information including a status code indicating the status of the first printing device, an identification code of the first printing device, and information causing the second printing device to print the status of the first printing device, wherein the second printing device generates additional print data including a status message converting the status code to text or an image, and an identifier converting the identification code to text or an image.

16. The control method of a print control device described in claim 15, wherein:

the receiving operation includes receiving print data for order content; and the applying operation includes determining the redirection path for redirection control according to the order content in the print data.

17. The control method of a print control device described in claim 15, further comprising:

configuring print settings including the printing direction of the additional information;

wherein the sending operation includes sending the additional information added to the print data during redirection control, based on a setting of the configuring operation.

* * * * *